United States Patent

Leigeber

[11] Patent Number: 5,901,495
[45] Date of Patent: May 11, 1999

[54] CLIP-ON LURE-UNSNAGGING WEIGHT

[76] Inventor: Richard L. Leigeber, 1466 County Rd., 1422, Cullman, Ala. 35058

[21] Appl. No.: 09/044,824

[22] Filed: Mar. 20, 1998

Related U.S. Application Data

[60] Provisional application No. 60/046,216, May 12, 1997.
[51] Int. Cl.⁶ ..................................... A01K 91/00
[52] U.S. Cl. ......................... 43/44.92; 43/44.87; 43/43.12
[58] Field of Search ................ 43/44.87, 44.92, 43/43.12

[56] References Cited

U.S. PATENT DOCUMENTS

| | | | |
|---|---|---|---|
| 1,441,230 | 1/1923 | Legge | 33/720 |
| 1,789,988 | 1/1931 | Samuel | 43/43.1 |
| 2,464,715 | 3/1949 | Peterson | 33/719 |
| 2,577,549 | 12/1951 | Vice | 43/44.97 |
| 2,594,620 | 4/1952 | Braithwaite | 43/44.9 |
| 3,740,803 | 6/1973 | Arteburn | 43/43.12 |
| 4,535,562 | 8/1985 | Fry | 43/44.95 |
| 5,042,191 | 8/1991 | Fett | 43/44.83 |
| 5,076,006 | 12/1991 | Kahng | 43/43.12 |

FOREIGN PATENT DOCUMENTS

| | | | |
|---|---|---|---|
| 42196 | 5/1933 | France | 43/44.92 |
| 909924 | 5/1946 | France | 43/44.92 |
| 959600 | 3/1950 | France | 43/43.12 |
| 2375821 | 9/1978 | France | 43/44.92 |
| 2587172 | 3/1987 | France | 43/44.92 |
| 1914776 | 12/1990 | U.S.S.R. | 43/44.87 |
| 690469 | 4/1953 | United Kingdom . | |

*Primary Examiner*—Michael J. Carone
*Assistant Examiner*—Fredrick T. French, III
*Attorney, Agent, or Firm*—Richard C. Litman

[57] ABSTRACT

A clip-on weight is provided for quick and simple attachment to a fishing line. The clip-on weight includes a clip and a weight attached to one end of the clip. The clip is formed from a unitary length of wire which is bent around itself such that a plurality of legs is defined. Three U-shaped bends are formed to interconnect the legs. The clip is designed such that it is generally planar and the legs are parallel to one another. The weight is disposed around the first bend and is formed from dense metallic materials such as lead. The weight extends upwardly such a distance that it terminates slightly below the third bend, and also extends downwardly a predetermined distance such that the first bend may be centrally disposed therein. The clip-on weight is clipped onto a fishing line where it can easily slide down to make contact with a lure attached at the end of the fishing line to unsnag it from an underwater obstacle.

13 Claims, 1 Drawing Sheet

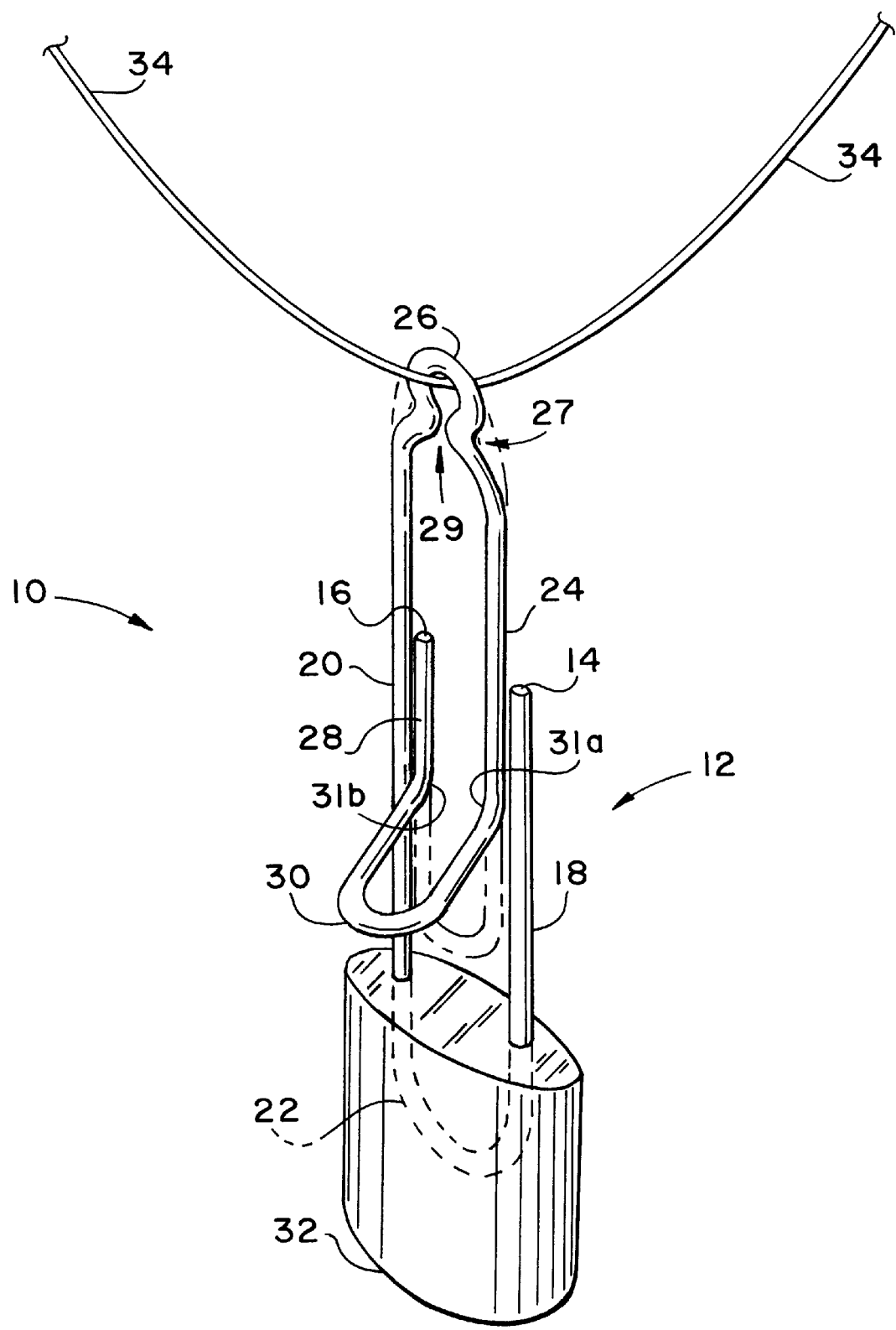

CLIP-ON LURE-UNSNAGGING WEIGHT

CROSS-REFERENCE TO RELATED APPLICATION

This application claims the benefit of U.S. Provisional patent application Ser. No. 60/046,216, filed May 12, 1997.

BACKGROUND OF THE INVENTION

1. Field of the Invention

The present invention relates to fishing line weights and more particularly to weights used for retrieving a fouled or snagged line and fishing lure.

2. Description of Related Art

Different weights used with fishing lines and lures and having a variety of functions or purposes are well known in the art. For example, U.S. Pat. No. 1,441,230 issued on Jan. 9, 1923 to Legge discloses a depth sounder for sounding the depth of water while fishing. The device includes a base and parallel bars which are constructed and connected so as to assure the free movement of the upper part of one bar with respect to the other bar so that they may easily and readily function together to engage a hook or other object. One of the bars is constructed with a loop, while the other bar is constructed with a bent portion capable of cooperating with the loop to form a tension eye in which a hook may be inserted and retained, thus eliminating the need for a line knot or loop.

U.S. Pat. No. 1,789,988 issued on Jan. 27, 1931 to Samuel discloses a fishing line sinker. The device includes a body constructed of cast or molded heavy metal such as lead. The body has an ellipsoidal shape with the minor axis equalling 40–50% of the major axis. A wire is formed at each end and reenters the body to form a fastening eye at each end. The wire is held within the body of the metal so that slipping is prevented.

U.S. Pat. No. 2,464,715 issued on Mar. 15, 1949 to Peterson discloses a depth sounder having a non-buoyant body element in the form of an elongated cylinder. A bore extends axially to the bottom of the body, with yieldingly compressible material disposed therein. A pair of spaced resilient legs are bent at right angles and terminate in a looped end which is laterally offset from the adjacent side edge of the cylindrical body. The legs converge toward each other to an approximate abutting relationship so as to define a normally closed, line-receiving aperture.

U.S. Pat. No. 2,577,549 issued on Dec. 4, 1951 to Vice discloses a fishing sinker adapted for attachment to a fishing tackle. The sinker is formed as a substantially flat body of generally tear-drop configuration. An apex is provided whereat a loop or eye is formed for attachment of a fishing tackle thereto. Camming edges run from the apex to impart a turning movement to the sinker when obstructions are encountered. Thus, the sinker would be turned about the apex in order to easily pass over the obstruction.

U.S. Pat. No. 2,594,620 issued on Apr. 29, 1952 to Braithwaite discloses a detachable and releasable connector for fishing sinkers. The device includes a connector formed of spring wire that is first inserted through one eye of a swivel and then inserted through the opening of the sinker. The connector emerges from the opposite end of the sinker and spreads to firmly grip the lower end of the sinker in order to prevent accidental disengagement through normal use.

U.S. Pat. No. 3,740,803 issued on Jun. 26, 1973 to Arteburn discloses a fishing weight clip. The clip consists of a substantially compressible resilient V-shaped body having a lowermost portion with a pair of leg portions which extend upwardly and angularly therefrom. At the terminal end of one leg portion is a coil-like portion which is operable to engage a fishing line and at the terminal end of the other leg portion is a hook. A hook-like stop portion is present at the lowermost portion of the body such that when the leg portions are compressed together the stop portion may be inserted through an aperture of a sinker or weight, and when the leg portions are released the stop portion prevents the lowermost portion from separating from the sinker.

U.S. Pat. No. 5,042,191 issued on Aug 27, 1991 from Fett discloses a clip for attaching a fishing lure and the like. The clip includes a line attaching loop and a pair of elongated diverging tension bars which extend symmetrically from free ends of the loop. The tension bars include a pair of inwardly converging bars carried thereby, with overlapping loops which are separable by depressing the tension bars between the thumb and forefinger for changing or replacing a fishing lure.

British Patent No. 690,469 published on Apr. 22, 1953 discloses improvements relating to leads for removable attachment to fishing lines. One or more wire attachment members in the form of a complete loop or ring with split overlapping portions project from the lead, or weight. The weight can be quickly attached at any point to the line without untying one from the other or disturbing the lure.

However, none of the above inventions and patents, taken either singly or in combination, is seen to describe the instant invention as claimed.

SUMMARY OF THE INVENTION

The clip-on weight according to the invention provides a quick and simple way of attaching a weight to a line while fishing with a lure, which weight may be attached while the lure is snagged and in the water, slid down the length of the line and, by the weight's momentum, dislodge a fishing lure from the snagging underwater object. Moreover, the weight may be similarly used to lodge near the nose of the lure, thereby lowering the depth at which the lure travels.

The clip-on weight includes a clip and a weight attached to one end of the clip. The clip is formed from a unitary length of wire which is bent around itself such that a plurality of legs having U-shaped bends is defined, resembling a paper clip. Three U-shaped bends are formed to interconnect the legs, defining an outer lowermost u-bend, an outer topmost u-bend, and an inner u-bend. The weight is attached to the first or outer lowermost u-bend and associated legs, the weight being preferably formed from dense metallic materials, such as lead. The weight terminates slightly below the third or inner u-bend, and also extends a predetermined distance beyond the first bend such that the first bend may be centrally disposed therein.

The legs are generally parallel to one another and lie generally in a single plane, but the inner pair of legs include a bend which angles the inner u-bend out of such plane to form a lip for initially guiding the line onto the clip. The outer topmost bend has a circular loop which, when the weight is clipped onto a fishing line, slides down the line and contacts a lure attached at the end of the fishing line. The legs may be plastic coated to minimize friction with the fishing line, and protect against corrosion of the legs.

Accordingly, it is a principal object of the invention to provided a clip-on lure unsnagging weight for fishing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

The sole FIGURE is a perspective environmental view of a clip-on weight according to the present invention.

DETAILED DESCRIPTION OF THE PREFERRED EMBODIMENT

Referring to the FIGURE, a clip-on weight is shown and generally indicated by the numeral 10. The clip-on weight 10 includes a clip 12 and a weight 32 attached thereto. The clip 12, which may be a preformed conventional paper clip, is formed from a unitary length of wire having a first end 14 and a second end 16. The wire may be of various composition, for example metallic or plastic, so long as it contains a generally uniform cross-section. The wire is bent around itself such that it defines distinct portions of the clip 12.

An outer leg 18 and an outer connecting leg 20 are defined such that they are oriented generally parallel to one another. A first bend 22 having a substantially U-shaped design is formed by the wire in order to interconnect and facilitate the parallel orientation of the outer leg 18 and the outer connecting leg 20. An inner connecting leg 24 is defined in a parallel manner to the outer connecting leg 20. A second bend 26 having a general U-shaped design provides interconnection between the inner connecting leg 24 and the outer connecting leg 20. The second bend 26 includes a constriction 27, which further defines a broken loop which has an inlet 29. The inlet 29 is gapped to allow the passage of a fishing line, and substantially retain the line within the loop. In a less desirable embodiment, the constriction 27 may be omitted, as shown in phantom lines, wherein the second bend 26 appears identical to the first bend 22.

An inner leg 28 is parallel to the inner connecting leg 24 and interconnected thereto by a third bend 30. The inner connecting leg 24 is angled slightly at a bend 31*a* near the end opposite the second bend 26. The inner leg 28 is also angled in a manner corresponding to that of the inner connecting leg 24 at bend 31*b*. Accordingly, the third bend 30 is angled about 45 degrees relative to a plane passing through both the inner connecting leg 24 and the inner leg 28. The inner leg 28 terminates at the second end 16. The bends 31*a*, 31*b* may also be omitted in a less desirable alternative embodiment, wherein the third bend 30 lies in the same plane as that of the first and second bends, as shown by phantom lines.

The outer connecting leg 20 has the greatest length and the outer leg 18 is greater than one half the length of leg 20. The inner connecting leg 24 and the inner leg 28 are also both of shorter length than the outer connecting leg 20. The first, second, and third respective bends 22, 26, 30 are each substantially U-shaped in order to provide a 180° bend to the wire. In a preferred embodiment of the invention, the clip 12 is designed such that the outer leg 18 is approximately two thirds the length of the outer connecting leg 20. The inner connecting leg 24 is sized substantially equal in length to the outer leg 18, while the inner leg 28 is approximately half the length of the outer leg 18. The legs may be plastic coated to minimize friction with the fishing line, and protect against corrosion of the legs.

The weight 32 is disposed around the first bend 22. The weight 32 is preferably formed from dense metallic materials such as lead. Other metallic materials can be similarly incorporated into the clip-on weight 10 according to the invention as a matter of preference. The weight 32 is molded such that it completely engulfs the first bend 22. The weight 32 has a generally elliptical cross-section and is preferably sized such that the second bend 22 is centrally disposed therein. Furthermore, the weight 32 extends upwardly such a distance that it terminates slightly below the third bend 30. The weight 32 also extends downwardly a predetermined distance so that the first bend 22 is centrally disposed therein.

In use, the offset position of the third bend 30 allows a fishing line 34 to be easily slid into clip 12 and placed in contact with the second bend-and-loop 26. The clip-on weight 10 will freely slide down the line so that it will make contact with a lure (not shown) attached to the end of the fishing line 34. Once the clip-on weight 10 reaches the lure, its momentum is sufficient to dislodge a lure snagged on an underwater obstacle, thus allowing retrieval of both.

It is to be understood that the present invention is not limited to the sole embodiment described above, but encompasses any and all embodiments within the scope of the following claims.

I claim:

1. A clip-on weight comprising:
   a clip formed from a unitary length of wire, said wire being bent at three locations to define:
   an outer leg,
   an outer connecting leg oriented generally parallel to said outer leg,
   a first bend interconnecting said outer leg with said outer connecting leg,
   an inner connecting leg oriented generally parallel to said outer connecting leg, said inner connecting leg being slightly angled at one end,
   a second bend interconnecting said outer connecting leg with said inner connecting leg,
   an inner leg oriented generally parallel to said inner connecting leg, said inner leg being slightly angled at one end in registry with said inner connecting leg, and
   a third bend interconnecting said inner connecting leg with said inner leg, and said third bend being offset by an angle from the plane of said clip with respect to said inner connecting leg and said inner leg,
   said inner connecting leg being substantially equal in length to said outer leg,
   said inner leg being approximately half the length of said outer leg; and
   a weight of metallic construction disposed around said first bend, said weight being cast around said first bend and extending upwardly to a location slightly below said third bend, and said weight extending downwardly beyond said first bend.

2. The clip-on weight according to claim 1, wherein said offset of the third bend is angled about 45 degrees.

3. The clip-on weight according to claim 1, wherein said second bend further includes a constriction thereby defining a broken loop having a gap slightly in excess of the diameter of a fishing line.

4. The clip-on weight according to claim 1, wherein said weight is constructed of lead.

5. The clip-on weight according to claim 1, wherein said clip is coated with a layer of non-corrosive material.

6. The clip-on weight according to claim 1, wherein said layer of non-corrosive material is plastic.

7. A clip-on weight comprising:
   a clip formed from a unitary length of wire, said wire being bent at three locations to define:

an outer leg, an outer connecting leg oriented generally parallel to said outer leg, a first bend interconnecting said outer leg with said outer connecting leg, an inner connecting leg oriented generally parallel to said outer connecting leg, a second bend interconnecting said outer connecting leg with said inner connecting leg, an inner leg oriented generally parallel to said inner connecting leg, and a third bend interconnecting said inner connecting leg with said inner leg, said inner connecting leg being substantially equal in length to said outer leg, said inner leg being approximately half the length of said outer leg; and a weight of metallic construction disposed around said first bend, said weight being cast around said first bend and extending upwardly to a location slightly below said third bend, and said weight extending downwardly beyond said first bend.

8. The clip-on weight according to claim 7, wherein said third bend is offset at an angle relative to a plane passing through said first and second bends.

9. The clip-on weight according to claim 8, wherein said offset at is angled about 45 degrees.

10. The clip-on weight according to claim 7, wherein said second bend includes a constriction thereby defining a broken loop having a gap slightly in excess of the diameter of a fishing line.

11. The clip-on weight according to claim 7, wherein said weight is constructed of lead.

12. The clip-on weight according to claim 7, wherein said clip is coated with a layer of non-corrosive material.

13. The clip-on weight according to claim 12, wherein said layer of non-corrosive material is plastic.

\* \* \* \* \*